United States Patent
Marenco et al.

(10) Patent No.: US 6,331,988 B1
(45) Date of Patent: *Dec. 18, 2001

(54) MULTIPLE LINE FRAMER ENGINE

(75) Inventors: Alvaro Luis Marenco; Jaime Tadeo Mitchell, both of Bethlehem, PA (US)

(73) Assignee: Agere Systems Guardian Corp., Allentown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,588

(22) Filed: Jul. 31, 1997

(51) Int. Cl.$^7$ ........................................................ H04J 3/06
(52) U.S. Cl. ............................................ 370/510; 370/540
(58) Field of Search .................................... 370/470, 472, 370/509, 510, 512, 514, 517, 476, 513, 537, 538, 539, 540, 541; 375/365, 366

(56) References Cited

U.S. PATENT DOCUMENTS

| | | | | |
|---|---|---|---|---|
| 3,867,579 | * | 2/1975 | Colton et al. | 370/509 |
| 4,819,226 | * | 4/1989 | Beckner et al. | 370/395 |
| 4,833,671 | * | 5/1989 | Beckner et al. | 370/429 |
| 5,398,234 | * | 3/1995 | O'Connel et al. | 370/522 |
| 5,528,579 | * | 6/1996 | Wadman et al. | 370/249 |
| 5,588,000 | * | 12/1996 | Rickard | 370/509 |
| 5,608,735 | * | 3/1997 | McCullough et al. | 370/513 |
| 5,615,237 | * | 3/1997 | Chang et al. | 370/513 |
| 5,710,774 | * | 1/1998 | Suh et al. | 370/513 |

OTHER PUBLICATIONS

"DSP based architecture for real–time T1 bandwidth Management and Control" appeared in IEEE Communications, 1990 ICC '90, Including Supercomm Technical Sessions. Supercomm/ICC '90. Conference Record., IEEE International Conference on , pp. 690–697 vol. 2.*

IEL/IEC ref numbers for the citation above are: CH2829–0/90/0000–0690. The Conference was Held Apr. 16–19, 1990. 4 pages total (vol. XXX+1759).*

* cited by examiner

Primary Examiner—Melvin Marcelo
Assistant Examiner—Soon-Dong Hyun
(74) Attorney, Agent, or Firm—Gibbons, Del Deo, Dolan, Griffinger & Vecchione

(57) ABSTRACT

A single framer engine operates on multiple DS1 lines. The framer engines includes a memory structure for pre-aligning and storing data received from a line interface unit. The memory structure is configurable for compatibility with standard transmission formats. A recognition or comparison unit processes the pre-aligned data to determine the proper pattern sequence.

26 Claims, 3 Drawing Sheets

MULTIPLE LINE FRAMER ENGINE

FIELD OF THE INVENTION

This invention relates to the field of telecommunications and in particular, to a single framer engine which frames multiple lines simultaneously.

BACKGROUND OF THE INVENTION

In telecommunications, the standard for digital transmission is a T1 line. The T1 digital transmission link has a capacity of 1.544 Mps in North America and a capacity of 2.048 Mps elsewhere. The T1 digital transmission link normally handles 24 voice conversations, each one digitized at 64 Kbps. That is, the 24 voice channels are sampled at an 8 kHz rate, with 8 bits per sample. In the telecommunications field, each 8 bit conversation sample is termed digital service, level 0 or DS0. The 24, 8 bit samples are time division multiplexed together to form a digital service, level 1 or DS1.

In general, a frame is a logical transmission unit which has a defined format so that the receiving equipment can recognize the meaning and purpose of the specific bits. Frames usually contain their own control information for addressing and error checking. In telecommunications, a frame or a DS 1 frame is a sample of all 24 channels plus a synchronization bit called a framing bit. The framing bit has an identifiable data sequence patterned thereon to identify individual time slots within the time division multiplexed frame. As such, each frame has a block length of 193 bits (i.e., 24×8+1). Specifically, the first bit is a frame overhead bit, while the remaining bits are available for data or payload. Frames are transmitted at a rate of 8 kHz, thus creating the 1.544 Mps transmission rate of a North American T1 digital transmission link.

In telecommunications, two well known framing formats are the superframe and the extended superframe formats. The superframe transmission format consists of 12 DS1 frames, i.e., it has 12 separate 193 bit frames equaling 2316 bits. As stated above, the first bit position is the frame overhead bit position and is used for the frame and signaling phase alignment. The extended superframe transmission format groups together 24 DS1 frames as opposed to the 12 in the superframe format. Since the 12 positions in the superframe format (or 24 bits in the extended superframe format) do not necessarily fall in the right sequential order, there is a need to identify then from within the data stream. This is the objective of the framer.

In general, a framer engine operates on one DS1 signal at a time. The entire DS1 data stream is loaded into memory and then the framer processor examines the memory to determine where the framing pattern is. However, there is currently a growing demand to frame up simultaneously on four DS1 lines in a single framer engine. In addition, this demand may extend to frame up to eight or more DS1 lines in a single framer. The prior art framers utilize a shifter based approach, which in terms of computational functionality is feasible. A major drawback of this approach is that it operates on one DS1 signal at a time and as a result requires four single framers to operate on four DS1 lines. Specifically, the shifter based approach utilizes long shift registers to search for a particular framing bit pattern. The search mechanism looks at every 193rd bit in a superframe or every 772nd bit in an extended superframe and taps/offsets to the appropriate location until a correct successive pattern found. A drawback of this approach is that it is completely hardwired and uses a large number of logic gates. This in turn utilizes a large silicon area which could have been used for other functionality. As such, although prior art systems are computationally feasible, it is at a high cost.

Accordingly, there is a need to provide a simple and efficient framer engine structure and method which accommodates multiple DS1 lines at competitive costs.

SUMMARY OF THE INVENTION

The present invention teaches a structure and a method for simultaneously framing up data of multiple DS1 lines onto a single framer engine. The framer engine is employable with standard transmission formats. Importantly, the present invention tracks and exploits technological advances in random access memory development without expensive modification to the framer engine.

In an exemplary embodiment of the present invention, input data is pre-aligned and stored onto a memory structure, such as a random access memory. A recognition or comparison unit then performs the recognition of the framing bit sequence. The present invention provides memory configurations for all of the standard transmission formats so that the input data is properly pre-aligned prior to the recognition processing. Importantly, the present invention design occupies a smaller amount of the silicon block as compared to a long shifter.

Advantageously, the structure and method of the present invention is utilizable with any number of DS1 lines. The above factors make the present invention a cost effective and efficient device for simultaneously framing multiple DS1 lines with a single framer engine configuration.

BRIEF DESCRIPTION OF THE DRAWINGS

A more complete understanding of the present invention may be obtained from consideration of the following description in conjunction with the drawings in which.

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIGS. 1–2 may be provided by a single shared processor. (Use of the term "processor" should not be construed to refer exclusively to hardware capable of executing software.) Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

In general, the present invention utilizes a combination of an external random access memory ("ERAM") and a recognition/comparison unit. Specifically, the insertion of a memory-based approach permits the pre-alignment of the bits stored in the memory and therefore simplifies the manner in which the data is processed.

Figure 1:
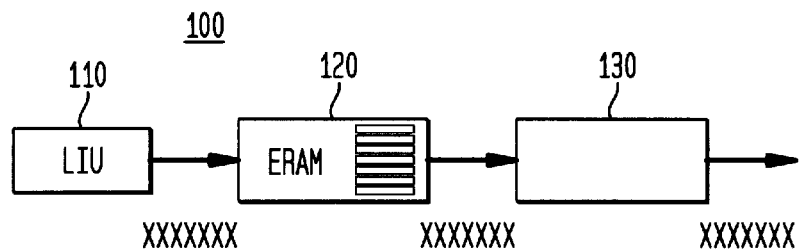
FIG. 1 is a block diagram of an exemplary embodiment of the present invention.
Figure 2:
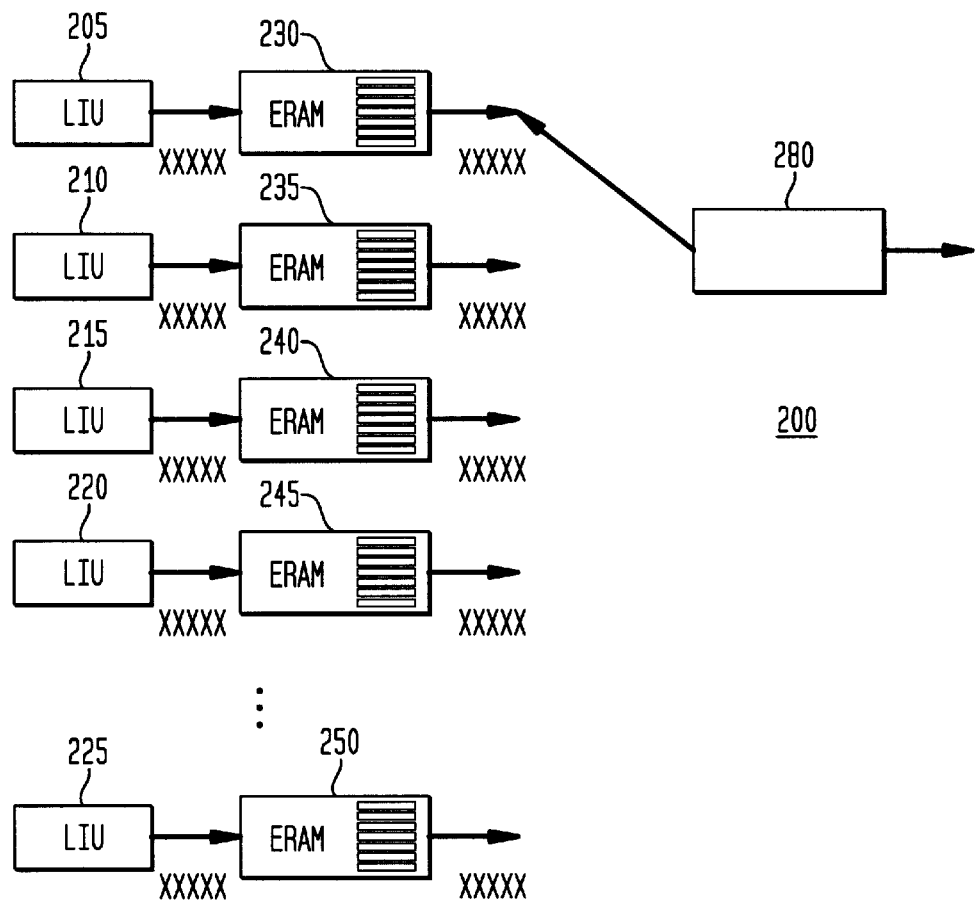
FIG. 2 is an exemplary embodiment of a single processing unit operating on multiple DS 1 lines in accordance with the present invention.

Referring to FIG. 1, there is shown a functional block diagram 100 of the present invention scheme for framing multiple lines on a single framer engine. Data is input from a line interface unit 110 ("LIU") at a rate of $1.544 \times 10^6$ bits per second (bps). The data is pre-aligned and stored in a memory bank 120. Memory bank 120 is generally a random access memory, such as an external random access memory, a content addressable memory or any similar functional structure. An external processing unit 130 performs the recognition of the framing bit sequence. The external processing unit can be any fixed-point DSP processor, a RISC processor or any similar microprocessor. Referring to FIG. 2, a system 200 is illustrated where a single processing unit 280 is framing up multiple DS1 lines. In particular, single processing unit 280 is accessing the pre-aligned data from memory structures 230–250, which had received input data from LIUs 205–225. Processing unit 280 then determines the proper framing bit sequence.

Figure 3:
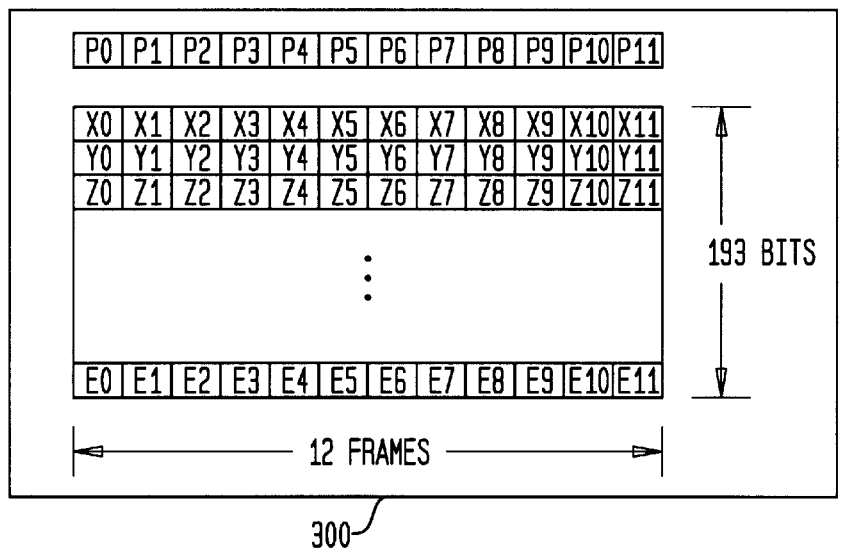
FIG. 3 is a memory configuration for a superframe format in accordance with the present invention.

Referring to FIG. 3, there is shown a memory bank 300 which illustrates the memory configuration required for a single superframe format. That is, it depicts data which is properly aligned in 12-bit words containing a tentative pattern sequence. Bits $X_n$ $Y_n$ $Z_n$ ... $E_n$,=0, 1, 2, ... 11 represent a complete 193-bit sequence or a single frame (from top to bottom). Horizontally, bits $X_0$ $X_1$ $X_2$ ... $X_{11}$, $Y_0$ $Y_1$ $Y_2$ ... $Y_{11}$, $E_0$ $E_1$ $E_2$ ... $E_{11}$ represent tentative pattern sequences. That is, each horizontal row is a tentative pattern sequence which is tentative until processed by the processing unit to determine the proper pattern sequence. Data is stored sequentially from top to bottom.

As illustrated in FIG. 3, memory bank 300, for example, an external random access memory, is composed of 193 12-bit words. Each word contains every 193 bits from the 2316 bit data stream. Each word is extendible to 13, 16, 24, or even 48 bits, to provide additional efficiency in the utilization of the resources. This enhanced memory configuration permits the processing unit to check up to at least one more superframe in advance.

Figure 4:
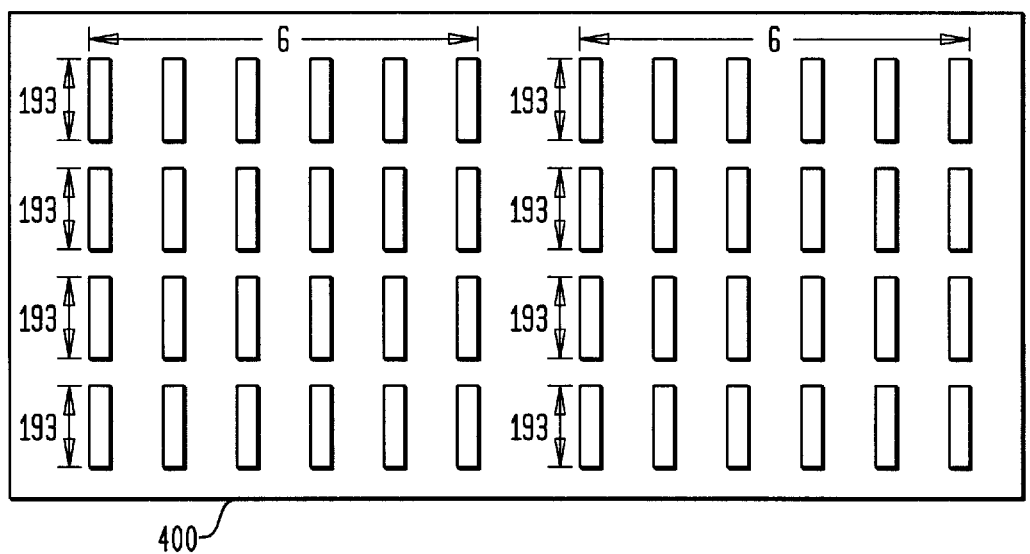
FIG. 4 is a memory configuration for an extended superframe format in accordance with the present invention.

Referring now to FIG. 4, there is illustrated a memory configuration 400 for use with an extended superframe format, which permits easier processing and more efficient use of the resources. By utilizing this transmission format, the present invention memory configuration accommodates two 6 bit patterns in a single 12-bit word, or equivalently, processes two extended superframes per single compared sequence. For a single extended superframe, 722 bit words are needed per column, i.e., 4 vertical 193 bit words.

By utilizing the present invention memory configuration to pre-align the data prior to recognition/comparison processing, there are various alternative methods for implementing the framer engine on the single silicon block. These alternative implementations are available due to the smaller area a memory block occupies as compared to the area used by the long shifters of the prior art which search for the proper framing bit pattern. The long shifters tend to occupy very large amounts of area, approximately 40 percent of a single framer. The dependency on large silicon areas for fabrication is one of the primary disadvantages of prior art framers. For example, in an exemplary embodiment, a digital signal processing core or any other similar processing element and the external memory configuration are integratable as a single framer unit in the same silicon block.

In general, there are two important implementations that are utilizable as a result of the memory configuration of the present invention. First, the comparison or framing bit recognition operations are implementable using a processing unit, i.e., a digital signal processor, which is either externally or internally within the same chip. Alternatively, elimination of the processor unit from the external block is possible by forming a single framer within a single silicon chip by implementing the comparison operations using a random access memory-logic-array ("RAMLA") approach. This approach permits a single framer to operate more than four DS1 lines on a single chip with no microprocessor dependency. The number of lines that can be processed is only limited due to the memory size and access capabilities. This latter approach is implementable using either a single comparator or a content addressable memory ("CAM"). Although a single comparator may be more cost effective since it occupies less area, it takes more processing time. Therefore, it is important to determine an optimal balance between the single comparator and the CAM configuration in terms of area and processing time. The drawback of this latter approach is in its lack of modularity as compared to the external processor unit, i.e., the DSP processor.

Figure 5:
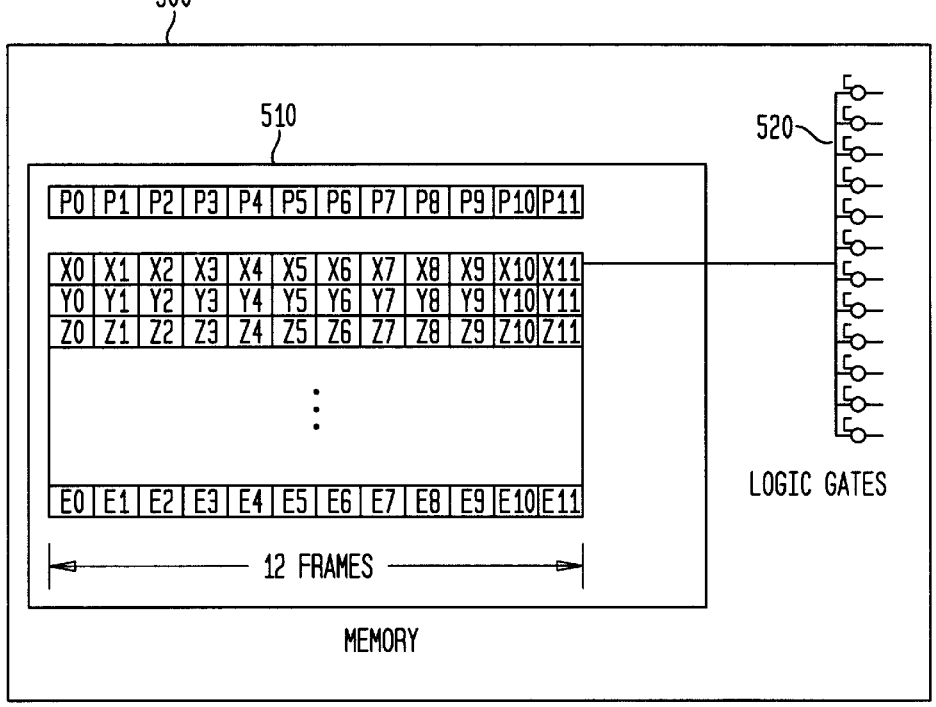
FIG. 5 is an exemplary embodiment of a comparison structure in accordance with the present invention.
Figure 6:
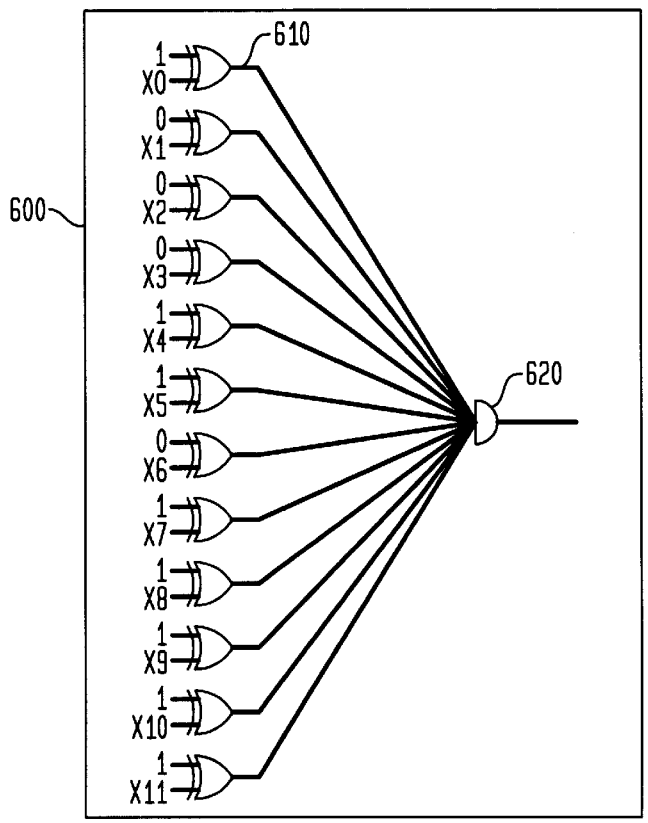
FIG. 6 is another exemplary embodiment of a comparison structure in accordance with the present invention.

Referring now to FIG. 5, an exemplary implementation is shown of a framing bit comparison using a single comparator. Specifically, a RAMLA configuration 500 is depicted, which includes a memory bank 510 and a logic array 520. Operationally, one input comes from a tentative pattern sequence and the other comes from a predetermined framing bit sequence, basically $P_0$, $P_1$, ... , $P_{11}$. A maximum of twelve possible patterns are compared, each one coming from a rotated version, e.g., a 1 bit rotation, of the standard framing bit sequence. Referring to FIG. 6, there is shown a CAM configuration 600, which includes a comparator using XOR 610 and AND 620 gates to determine the proper pattern sequence. In this embodiment, bits $X_0$ $X_1 X_2$ ... $X_{11}$ from a memory bank are compared against predetermined framing bit sequence 1000110111100. In the CAM approach, for example, 193 comparators are used for the superframe format. Therefore, every single memory address, i.e., the 12 bit data, is processed in a parallel fashion, allowing for much faster detection, but requiring larger silicon area.

Described herein is a memory based framer approach which pre-aligns data prior to determining the proper pattern sequence. The utilization of the memory based approach results in multiple alternative embodiments of the recognition/comparison unit. The selection of the proper alternative being dependent upon several factors including the available silicon area and the processing speed required. The four illustrated embodiments include a single RAMLA configuration in which data is compared in 12-bit packets, a CAM configuration in which an entire superframe is processed in a parallel fashion, an embedded combination of a RAM and a processing unit, for example, a DSP core or RISC processor, all on a single chip and a combination of a RAM and an external processing unit.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the elusive use of all modifications which come within the scope of the appended claim is reserved.

What is claimed:

1. A telecommunications system comprising:

a line interface unit;

a framer engine for framing up data from multiple telecommunication lines, said framing engine including:

at least one memory bank for pre-aligning and storing data received from said line interface unit, said at least one memory bank having a memory configuration for use with a given frame transmission format; and a recognition unit responsive to said pre-aligned and stored data for determining a given framing bit pattern.

2. The system according to claim 1, wherein said given frame transmission format is a superframe format.

3. The system according to claim 1, wherein said given frame transmission format is an extended superframe format.

4. The system according to claim 1, wherein said memory bank is a random access memory.

5. The system according to claim 1, wherein said memory bank and said recognition unit are implemented on a single silicon chip.

6. The system according to claim 1, wherein said recognition unit is implemented externally with respect to said memory bank.

7. The system according to claim 1, wherein said memory bank and said recognition unit are implemented as a single random access memory-logic array configuration wherein said pre-aligned data is compared in 12 bit words.

8. The system according to claim 1, wherein said memory bank and said recognition unit are implemented as a content addressable memory configuration wherein an entire frame transmission format is processed in a parallel format.

9. The system according to claim 1, wherein:

said given frame transmission format is an extended superframe format; and said memory configuration aligns two extended superframes.

10. The system of claim 1 wherein said telecommunications lines are DS1 lines.

11. An apparatus for framing up data of multiple multiplexed telecommunications lines, said apparatus comprising:

a line interface unit responsive to the multiplexed telecommunication lines;

at least one memory bank for pre-aligning and storing data received from the line interface unit;

a memory configuration utilized on said at least one memory bank for use with a given frame transmission format; and a comparison unit for processing aligned and stored data received from said at least one memory bank to determine a given framing bit pattern.

12. The apparatus according to claim 11, wherein said given frame transmission format is a superframe format.

13. The apparatus according to claim 11, wherein said given frame transmission format is an extended superframe format.

14. The apparatus according to claim 11, wherein said memory bank is a random access memory.

15. The apparatus according to claim 11, wherein said memory bank and said comparison unit are implemented on a single silicon chip.

16. The apparatus according to claim 11, wherein said comparison unit is implemented externally with respect to said memory bank.

17. The apparatus according to claim 11, wherein said memory bank and said comparison unit are implemented as a single random access memory-logic array configuration wherein said aligned data is compared in 12 bit words.

18. The apparatus according to claim 11, wherein said memory bank and said comparison unit are implemented as a content addressable memory configuration wherein an entire frame transmission format is processed in a parallel format.

19. The apparatus according to claim 11, wherein:

said given frame transmission format is an extended superframe format; and said memory configuration aligns two extended superframes.

20. The apparatus of claim 11 wherein said multiplexed telecommunication lines are DS1 lines.

21. A method for framing up data from multiple telecommunications lines on a single framer engine, said method comprising the steps of:

from said multiple telecommunications lines, receiving data into a memory bank which has a memory configuration for pre-aligning and storing data with respect to a given frame transmission format;

aligning and storing data utilizing said memory configuration; and utilizing a comparator to determine a given framing bit pattern.

22. The method according to claim 21, wherein said memory bank and said comparator are implemented on a single silicon chip.

23. The method according to claim 21, wherein said comparator is implemented externally with respect to said memory bank.

24. The method according to claim 21, wherein said memory bank and said comparator are implemented as a single random access memory-logic array configuration wherein said aligned data is compared in 12 bit words.

25. The method according to claim 21, wherein said memory bank and said comparator are implemented as a content addressable memory configuration wherein an entire frame transmission format is processed in a parallel format.

26. The method of claim 21 wherein said multiple telecommunications lines are DS1 lines.

* * * * *